United States Patent Office 3,484,201
Patented Dec. 16, 1969

3,484,201
SULPHUR PELLETIZATION
Louis Landucci, % Cominco Binani Zinc Ltd., Edayar, Post Bag 7, P.O. Udyogamandal, Kerala, India; Donald Roderick McKay, Box 866, Rossland, British Columbia, Canada; and Charles Alexander Sutherland, Chapman Camp, Kimberley, British Columbia, Canada
No Drawing. Filed July 14, 1967, Ser. No. 653,332
Claims priority, application Canada, Aug. 1, 1966, 966,877
Int. Cl. C01b 17/10
U.S. Cl. 23—224                                    8 Claims

ABSTRACT OF THE DISCLOSURE

A process for recovering elemental sulphur in the form of uniformly sized solid pellets from aqueous slurries containing finely divided sulphur and, in some cases, other finely divided solids such as gangue materials and metal sulphides. The slurry is heated to a temperature above the melting point of elemental sulphur to cause the sulphur particles to coalesce into liquid globules and the globules are then solidified into pellets by cooling the slurry. The rate of cooling in the temperature range between 115° C. and 110° C. is controlled at a rate less than about 1° C. per minute whereby clean, uniformly sized sulphur pellets are produced.

This invention relates to the pellitization of sulphur and, more particularly, it relates to improvements in the known procedure for recovering elemental sulphur in pellitized form from aqueous slurries containing finely divided sulphur and other solids.

It is well known that elemental sulphur can be conveniently recovered from native sulphur bearing ores by suspending the ore in finely divided form in water, heating the resulting slurry with agitation to a temperature above the melting point of sulphur to cause the fine sulphur particles to coalesce into globules, cooling the slurry to a temperature below the melting point of sulphur and then separating the sulphur, in the form of solid pellets, from the slurry. U.S. Patent No. 2,537,842, issued Jan. 9, 1951, describes one process which utilizes this pelletizing procedure in the treatment of native sulphur bearing ores.

It is also known to utilize similar pelletizing procedures to recover elemental sulphur from residues produced by the low temperature acid oxidation of pyrrhotitic mineral sulphides. Canadian Patent No. 547,012, for example, discloses a method for recovering elemental sulphur and non-ferrous metal values from pyrrhotitic mineral sulphides which contain non-ferrous metals. In this method the sulphides, in finely divided form, are dispersed in an aqueous medium to form a slurry which is reacted with a free oxygen bearing gas at an elevated temperature below about 140° C. for a time sufficient to convert sulphide sulphur contained in the material to elemental sulphur. The reaction may be conducted at temperatures above or below the melting point of sulphur (119° C.). At temperatures above the melting point of sulphur, a substantial portion of he non-ferrous metal bearing sulphides in the slurry coheres to or is occluded in the elemental sulphur globules formed during the reaction and the balance is dissolved in the leach solution. The relative amounts of non-ferrous metals dissolved in the solution and attached to or occluded in the elemental sulphur particles depends on the type of material treated and the precise operating conditions employed. Generally, high operating temperatures and short retention times favour the occlusion of a larger proportion of non-ferrous metal sulphides in the elemental sulphur particles, and lower operating temperatures and longer retention times favour dissolution of the non-ferrous metal values in the solution. At temperatures below the melting point of sulphur, the elemental sulphur reports in the residue in very finely divided particulate form and the bulk of the non-ferrous metal values is dissolved in the solution. The method thus can be operated either to concentrate the non-ferrous metal sulphides in the residue by occlusion in the elemental sulphur product with accompanying minimum dissolution of non-ferrous metals in the solution, or it can be operated to obtain maximum dissolution of non-ferrous metals in the solution with minimum loss of sulphides to the residue.

Another Canadian Patent, No. 618,623, is concerned specifically with the application of the latter procedure to the treatment of zinciferous mineral sulphides. According to this patent, finely divided zinciferous mineral sulphides are dispersed in an aqueous sulphuric acid solution to form a slurry and the slurry is heated to and maintained at a temperature below the melting point of sulphur while it is reacted with a free oxygen containing gas such as air. The heating with agitation and in the presence of the oxidizing gas is continued to extract substantially all the zinc content of the sulphide and dissolve it in the leach solution as $ZnSO_4$ with concurrent oxidation of sulphide sulphur to elemental sulphur. Elemental sulphur is recovered from the residue and zinc is recovered from the solution.

In the operation of these acid oxidation processes, it is generally desirable to recover the elemental sulphur from the leach-end residues by the simplest and most expedient procedures. One method towards this end is a sulphur agglomerating pelletization step similar to that described in U.S. Patent No. 2,537,842. Elemental sulphur formed during the oxidation leach is converted into discrete pellets by heating the slurry to a temperature above the melting point of sulphur to coalesce the elemental sulphur into liquid droplets or globules then cooling the slurry to solidify the globules into pellets or pebbles. These sulphur pellets can be readily removed from the mixture of solids and solution withdrawn from the reaction by passing the mixture over a screen having openings of a size sufficient to retain the sulphur pellets while passing the solution and undissolved residue.

This pelletizing procedure is generally satisfactory where the sulphur containing slurry subjected to treatment has a low impurity level ar where it is specifically desired to occlude a maximum amount of non-ferrous metal sulphides in the elemental sulphur as a means of concentrating same or separating them from gangue materials. However, it has disadvantages where it is desired to avoid the occlusion of sulphides and other sulphur wettable impurities and to recover elemental sulphur of the highest possible purity with a minimum number of processing steps regardless of the precise quality of the slurry being treated. Difficulty is most often encountered in the treatment of slurries derived from low temperature acid oxidation of nonferrous metal bearing mineral sulphides in that even under optimum conditions of time, temperature and pressure, etc., it is difficult to avoid the occlusion of small amounts of unleached non-ferrous metal bearing mineral sulphides and the sulphur pellets produced in the reaction vessel generally tend to be too fine for easy and economic separation from unleached metal sulphide particles.

We have now found that these problems can be reduced by closely controlling the rate of cooling in the globule solidification step of the pelletizing operation. More specifically, we have found that improved results are obtained by heating an elemental sulphur containing suspension to a temperature above hte melting point of sulphur to coalesce the elemental sulphur into liquid droplets then cooling the slurry to solidify the molten droplets into pellets, the rate of cooling in the temperature range between 115° C. and 110° C. being controlled at a rate less than about one centigrade degree per minute and preferably about one-half centigrade degree per minute or less. Sulphur pellets produced by this procedure and under these conditions are of superior quality in that they are uniformly sized and contain a substantial portion of +28 mesh standard Tyler screen pellets. Further, where the material treated is an acid oxidation leach-end residue, few unreacted sulphides are associated with the pellets and those present are lightly bonded to the surfaces of the pellets and can be readily separated therefrom by attrition such as is obtainable with vigorous agitation and/or screening.

Accordingly, the present invention provides an improved method for the recovery of elemental sulphur from aqueous slurries containing finely divided elemental sulphur and, in particular, from residues produced by the acid oxidation of non-ferrous metal bearing mineral sulphides at temperatures which effect conversion of sulphide sulphur to elemental sulphur. The invention also provides a method whereby high purity sulphur is recovered from such slurries with a minimum of processing steps.

By way of illustration, the invention is described in detail hereinbelow as applied to the treatment of residues derived from the low temperature aqueous acid oxidation of mineral sulphides. However, it is emphasized that the method is generally applicable to any aqueous sulphur bearing slurry regardless of source.

It is now well known that mineral sulphides of the general formula $Me_xS_x+1$, where Me represents a metal, can be treated hydrometallurgically for the recovery of metal values and sulphur in elemental form. These sulphides may be barren of economically recoverable non-ferrous metals or they may be associated with non-ferrous metal sulphides which contribute to the potential economic value of the material. The present invention is particularly applicable in treating sulphides in the latter category and, more particularly, in treating pyrrhotitic mineral sulphides which include, for example, zinc, copper, nickel, cobalt, gold, silver, cadmium and members of the platinum group. According to the known methods, such mineral sulphides, generally in a comminuted form such that they pass at least a 35 mesh standard Tyler screen and preferably 325 mesh screen, are charged into a closed reaction vessel such as an autoclave wherein they are leached in aqueous solution under a positive partial pressure of oxygen above about 5 pounds per square inch provided by a free oxygen containing gas such as air, oxygen enriched air or oxygen. The leach solution is normally an aqueous sulphuric acid solution; however, if iron monosulphide is present, water may be employed since, under reaction conditions, some sulphuric acid is rapidly formed.

The oxidation reaction can be conducted at temperatures as high as the boiling point of sulphur. In practice, however, the reaction is conducted at temperatures of from about 90° C. to about 150° C. When the oxidation is conducted at temperatures slightly below the melting point of sulphur, e.g. about 110° C., the elemental sulphur formed is in very finely divided particulate form and the major portion of the non-ferrous metals is dissolved in the leach solution. When the temperature is raised above the melting point of sulphur, e.g. 130–150° C., the elemental sulphur particles coalesce into liquid droplets. These droplets are then solidified into pellets by lowering the temperature to below the melting point of sulphur. Thus, where the temperature has been raised to above the melting point of sulphur during the oxidation step, the sulphur reports in the residue in the form of pellets and where the oxidation reaction is conducted throughout at temperatures below the melting point of sulphur the elemental sulphur reports in the residue in very finely divided particulate form. The sulphur pelletizing procedure of this invention is primarily applicable to residues in the latter category. At temperatures above the melting point of sulphur, even under optimum oxidation and pelletizing conditions, it is difficult to avoid occlusion of some unleached metal sulphides by the molten elemental sulphur and, in most cases, pellets formed during the oxidation reaction contain some unreacted sulphides which unnecessarily complicate the sulphur purification steps.

The pelletizing method of the invention can, of course, be carried out directly on the leach-end residue in the same reaction vessel in which the oxidation-leach was conducted or, alternatively, the residue can be separated from the solution, such as by filtration, and repulped in water. In most cases, however, in order to minimize the equipment required for handling, the residue, either before or after separation from the solution, is subjected to froth flotation. The resulting flotation concentrate, which contains substantially all elemental sulphur produced during the oxidation reaction as well as the major portion of any unleached metal sulphides is then pelletized, after repulping with water or weak acid solution if desired, in a separate operation under controlled conditions as described hereinbelow.

The froth flotation can be conducted in accordance with known sulphide flotation procedures. The residue may be floated directly in the warm leach solution or it may be separated from the solution such as by filtration, repulped in water and then floated. Conventional frothers and collectors can be used with the precise type and quantities of the flotation reagents depending on the composition of the residue and other operation conditions. Generally, 97% or more of the elemental sulphur and 75% or more of the unleached non-ferrous metal sulphides are readily recovered in the flotation step.

In the pelletizing step, which preferably is conducted on a batch basis, the leach residue or the flotation concentrates may be repulped with water or other readily available solution, such as spent electrolyte from the non-ferrous metals recovery plant. The pulp density is not critical but preferably it is adjusted to within the range of 20–40% solids. The slurry is heated in a suitable vessel equipped with agitation means for maintaining the solids in suspension to a temperature above the melting point of sulphur and preferably to about 125° C. The slurry is maintained at this temperature for a short period of time, normally 2–10 minutes, to permit coalescense of elemental sulphur particles. The slurry is then cooled rapidly to a temperature of about 115° C. and then is cooled at a rate of less than one centigrade degree per minute and preferably at one-half centigrade degree per minute or less in the temperature range of 115° C. to 110° C. There is no precise lower limit on the rate of cooling and normally this will be dictated by economic and operating considerations. In most cases, it will be desirable to avoid unnecessary prolongation of the retention time so that the cooling rate will be kept as close to the optimum one-half centigrade degree per minute as practicable.

The slurry is again rapidly cooled from 110° C. to about 80–90° C. and discharged. Clean uniformly sized sulphur pellets, a substantial portion of which are +28 mesh, are obtained. Any unleached metal sulphides associated with the pellets are lightly bonded to the outer surfaces of the particles. These impurities may be removed by attrition, for example, by 10 to 15 minutes vigorous agitation followed by screening and classification. The impurity content of the so-cleaned sulphur pellets is generally below 3% and these residual impurities are readily lowered to less than 0.02% by melting and filtering or settling.

The less than one centigrade degree per minute rate of cooling in the 115°–110° C. range is critical to the formation of relatively large, uniformly sized pellets. However, the rate of cooling down to the critical 115° C. temperature is not important. Cooling can be effected as rapidly as practicable to that point. Similarly, at temperatures below 110° C. the cooling rate is no longer critical. The cooling can be done by any suitable means such as flashing steam from the autoclave to the atmosphere, dilution with unheated solution or passing cooling water through heat transfer coils in the autoclave. Steam flashing is the most suitable for effecting rapid cooling of the slurry down to the 115° C. temperature but either of the other two methods is preferred for cooling in the critical 115 to 110° C. range as they permit the close control of the cooling rate.

The invention is further explained hereinbelow as employed in conjunction with the zinc recovery process as disclosed in Canadian Patent No. 618,623. In this embodiment, preferably the oxidation step is conducted at a temperature below the melting point of sulphur in the known manner then, instead of effecting direct pelletizing of the elemental sulphur contained in the residue, the slurry is subjected to a froth flotation operation to yield a flotation concentrate containing substantially all the elemental sulphur and unleached metal sulphides contained therein. This sulphur flotation concentrate is then upgraded from about 80% elemental sulphur to 97% elemental sulphur by pelletizing under controlled conditions as described above and subjecting the pellets obtained to attrition to remove sulphidic contaminants lightly bonded to the surfaces thereof. The pelletized sulphur product may then be treated by melting and filtration to produce 99.99% pure sulphur.

The improved results which can be obtained by the application of the method of this invention in the treatment of residues obtained from the low temperature acid oxidation of zinc sulphides are illustrated in runs 2 and 3 of the following examples:

A series of runs was conducted in which samples of a zinc sulphides concentrate containing 48.0% Zn, 10.1% Fe, 6.2% Pb, 31.1% S and balance gangue were oxidized and the elemental sulphur pelletized by different procedures. In each case, the material was slurried with water containing 1.1 moles $H_2SO_4$ per mole of zinc in the concentrate and the slurry was oxidized in an agitator equipped autoclave at a temperature of 110° C. and under a 100 p.s.i. oxygen overpressure. In each case, leaching time was 6 hours and zinc extraction about 93%. In run No. 1, the sulphur pelletization was carried out simply by increasing the temperature of the leach-end slurry to 125° C. for 5 to 10 minutes while agitating the slurry, then rapidly cooling the slurry to 83° C. The sulphur pellets, which were extremely small, were separated from the rest of the leach residue by screening. In run No. 2, the leach-end slurry was heated to 125° C. with agitation, rapidly cooled with agitation to 115° C. by flashing steam to atmosphere and then further cooled to 110° C. at the controlled rate of one centigrade degree per minute. The pellets were again separated by screening. In run No. 3, the leach solution was separated from the undissolved residue and subjected to a froth flotation operation. The flotation concentrate analyzed (percent): S°-83; Pb-1.5; Zn-5.0; Fe-3.3. 21 parts by weight of this sulphur flotation concentrate were then slurried with 100 parts by weight of a weakly acid $H_2SO_4$ solution. The resulting slurry was heated to a temperature of 124° C. in an autoclave and held at that temperature with agitation for 5 minutes. The slurry was then rapidly cooled to 114° C. with continued agitation by flashing steam and then cooled at a one-half centigrade degree per minute to 110° C. and cooled rapidly again to 90° C. The sulphur pellets produced in this step analyzed (percent): S°-95; Zn-2.0; Pb-0.5; Fe-0.4. These pellets were cleaned by vigorous agitation of the suspension followed by screening and elutriation to remove fines detached from the pellets by attrition. The analyses of the cleaned pellets obtained in runs 1, 2 and 3 are shown in Table 1.

TABLE 1

| Run | Sulphur pellet size, percent 28 mesh | Sulphur pellet analysis | | | | |
|---|---|---|---|---|---|---|
| | | Zn | Pb | Fe | S° | $S_t$ |
| 1 | 2.8 | 2.7 | 0.15 | 0.5 | 92.5 | 96.4 |
| 2 | 32.7 | 1.1 | 0.2 | 0.2 | 97.7 | 98.3 |
| 3 | 85.4 | 0.65 | 0.15 | 0.65 | 98.2 | 98.8 |

A sample of pellets from run No. 3 was melted and filtered through regular Shriver Press paper. The anlysis of the final product is shown in Table II.

Table II

Impurities in p.p.m.

Ash—60   Cu—0.1
As—1    Fe—5
Se—6    Pb—2
Te—2    Mg—0.1
Bi—1

No other impurities detected spectrographically.
Total sulphur (by difference), 99.99%.

It will be understood, of course, that modifications can be made in the preferred embodiments of the invention described herein without departing from the scope of the invention defined by the appended claims.

What we claim as new and desire to protect by Letters Patent of the United States is:

1. In the method of pelletizing sulphur in which an aqueous slurry containing elemental sulphur particles is heated with agitation in a pressure vessel to a temperature above the melting point of sulphur to cause sulphur particles to coalesce into liquid globules and said globules are then solidified into pellets by cooling the slurry, the improvement which comprises cooling said slurry in the temperature range of 115° C. to 110° C. at a controlled rate at least lower than one centigrade degree per minute whereby clean, uniformly sized sulphur pellets are produced.

2. The improvement of claim 1 in which the controlled rate of cooling is less than one-half centigrade degree per minute.

3. In the method of recovering elemental sulphur contained in a residue produced from the low temperature acid oxidation of non-ferrous metal bearing mineral sulphides in aqueous media in which the sulphur content of said residue is pelletized by heating an aqueous suspension of said residue in a reaction vessel to a temperature above the melting point of sulphur to cause sulphur particles contained therein to coalesce into liquid globules and said globules are then solidfied by cooling and recovered in pellet form, the improvement which comprises controlling the rate of cooling of said suspension in the temperature range of 115° C. to 110° C. at less than 1 centigrade degree per minute whereby uniformly sized pellets substantially free from unoxidized mineral sulphides are produced.

4. In the method of recovering elemental sulphur contained in a residue produced by the acid oxidation of non-ferrous metal bearing mineral sulphides in aqueous media at a temperature below the melting point of sulphur, the improvement which comprises subjecting said residue to froth flotation to recover elemental sulphur and metal sulphides therefrom as a flotation concentrate, pelletizing the sulphur content of said concentrate by heating an aqueous suspension of the concentrate in a reaction vessel to a temperature above the melting point of sulphur to cause sulphur particles contained therein to coalesce into liquid globules and then cooling said globules to below the melting point of sulphur to solidify them into pellets, the rate of cooling of said suspension in the temperature range of 115° C. to 110° C. being controlled at less than 1 centigrade degree per minute, and recovering product sulphur in pellet form.

5. The improvement according to claim 4 wherein the pellets are subjected to attrition to remove any unoxidized sulphides adhering to the surfaces thereof.

6. In the process of recovering elemental sulphur and nonferrous metal values from non-ferrous metal bearing mineral sulphides in which the sulphides are dispersed in an aqueous medium to form a slurry and the slurry is agitated and reacted at a temperature below the melting point of sulphur with a free oxygen bearing gas for a period of time sufficient to convert sulphide sulphur contained in the sulphides to elemental sulphur and nonferrous metal values are dissolved in the leach solution, the improved method for recovering elemental sulphur formed during said reaction which comprises the steps of subjecting residue from said reaction to froth flotation to recover elemental sulphur and unleached sulphides therefrom as a flotation concentrate, suspending said concentrate in an aqueous medium in a reaction vessel and heating the suspension with agitation at a temperature above the melting point of sulphur to cause sulphur particles to coalesce into liquid globules, cooling the suspension to below the melting point of sulphur to solidify the so-formed sulphur globules into pellets, the cooling rate in the temperature range of 115° C. to 110° C. being controlled at less than 1 centigrade degree per minute, subjecting the so-formed sulphur pellets to attrition to remove any unreacted sulphides attached to the surfaces thereof and recovering product sulphur.

7. The improvement according to claim 6 wherein the controlled rate of cooling is less than one-half centigrade degree per minute.

8. The improvement according to claim 6 wherein the cooling outside the temperature range of 115° C. to 110° C. is effected rapidly by flashing steam from the reaction vessel.

References Cited

UNITED STATES PATENTS

| 1,285,358 | 11/1918 | Perry | 23—224 |
| 1,378,084 | 5/1921 | Bacon et al. | 23—224 |
| 2,629,133 | 2/1953 | Morningstar et al. | 23—224 |
| 3,034,864 | 5/1962 | Nashner et al. | 23—224 |

FOREIGN PATENTS

| 1,229,501 | 12/1966 | Germany. |
| 763,936 | 12/1956 | Great Britain. |
| 1,001,486 | 8/1965 | Great Britain. |

OSCAR R. VERTIZ, Primary Examiner

G. O. PETERS, Assistant Examiner

U.S. Cl. X.R.

23—227, 308